INVENTOR.
Edward J. Agnew
BY
W. L. Stout
HIS ATTORNEY

Dec. 13, 1955  E. J. AGNEW  2,727,138
CAR RETARDER SPEED PRESSURE SELECTIVE CONTROL APPARATUS
Filed April 23, 1952  3 Sheets-Sheet 3

Fig. 1c.

INVENTOR.
Edward J. Agnew
BY
W. L. Stout.
HIS ATTORNEY

United States Patent Office 2,727,138
Patented Dec. 13, 1955

2,727,138

CAR RETARDER SPEED PRESSURE SELECTIVE CONTROL APPARATUS

Edward J. Agnew, Swissvale, Pa., assignor to Westinghouse Air Brake Company, Wilmerding, Pa., a corporation of Pennsylvania Application April 23, 1952, Serial No. 283,932

10 Claims. (Cl. 246—182)

My invention relates to card retarder speed pressure selective control apparatus, and more particularly to speed and pressure selecting circuits for car retarders of the electropneumatic type.

In classification yards using humps, car retarders are provided for governing the speed at which cuts of cars or car units approach the yard track into which they are being classified. Obviously, there is a correct speed at which a car unit should drift into the yard track and couple to the cars already standing on that track without too great an impact. That is, there is a correct speed at which a car unit should leave a card retarder. Thus, the degree of braking pressure or force exerted by a car retarder must be varied for different car units in order to have each unit leave the retarder at the correct speed. Generally, the car retarder is electrically controlled by an operator located in a tower where he can observe the car unit and govern the braking force of the car retarder according to the speed at which the car unit in his judgment is moving and also according to his judgment of the running conditions of the car unit.

In these hump yards the cars move from the hump under the influence of gravity and the speed of the individual car units varies depending among other things upon the speed at which it is pushed over the hump, the weight of each car and its contents, the temperature and the free running condition of the car. These circumstances make it difficult for an operator to properly judge the degree and extent of braking force that should be exerted by the car retarder in order to have the individual car units leave the retarder at the correct speed. It has been proposed to control the braking pressure or force of car retarders automatically according to the speed at which the car unit moves through a retarder and thereby eliminate the errors that may arise due to an operator wrongly judging the car speed and its running condition.

In bringing a car unit to the correct speed when electropneumatic car retarders are used, it is desirable to provide a given initial pressure on the retarder as the car enters the retarder and then reduce the pressure to a partial pressure as the car speed is lowered to near the correct or desired leaving speed and then finally release the retarder when the car is moving at approximately the correct leaving speed. It has been found that it is desirable to vary the initial pressure according to the desired leaving speed and also to vary the partial pressure to which the initial pressure is reduced according to the desired leaving speed. Furthermore, it has been found desirable to vary the partial pressure release speed and the full release speed for different leaving speeds.

In these automatic systems for card retarders of the electropneumatic type it is a problem to provide the necessary large selection of initial and partial pressure settings of the retarder for the large number of different leaving speeds that are required and to provide the necessary selection of the partial pressure release speeds and the full release speeds.

Accordingly, an object of my invention is the provision of improved car retarder selective control apparatus.

Another object of my invention is the provision of car retarder control apparatus incorporating novel means for selecting different initial and partial pressures for a retarder and also means for selecting different partial pressure release speeds and full release speeds for the retarder.

Again, a feature of my invention is the provision of novel and improved selective circuit terminal means for electropneumatic car retarders to enable the setting up of a large number of different pressure and speed releasing conditions of the car retarder.

A more specific feature of my invention is the provision of improved means for selecting any one of a group of initial pressures for the retarder when the car enters the retarder and any one of a group of partial pressures to which the initial pressure is reduced as the car approaches a desired or requested leaving speed for each of a relatively large number of different possible leaving speeds.

Furthermore, a specific feature of the invention is the provision of means for selecting any one of a group of partial and full release speeds for each of a series of different leaving speeds.

Other objects, features and advantages of my invention will appear as the specification progresses.

Electropneumatic car retarder mechanisms of the type here contemplated include braking bars mounted adjacent the track rails of a stretch of track and movable to a braking position where they engage the sides of the wheels of a car moving along the stretch and to a nonbraking position where the bars are free from the car wheels. Generally these braking bars are biased to the nonbraking or open positions and are movable to the braking or closed position by a group of independent pressure actuated motors, the braking force exerted depending upon the pressure of the fluid which is usually compressed air applied to the motors. The pressure applied to the operating motors is controlled by magnet valves, and in a widely used form of retarder mechanism the control is capable of setting up any one of four different pressure conditions. It is to be understood that my invention is not limited in its use to this specific arrangement of a car retarder control and it can be used with other control arrangements.

Furthermore, when an automatic speed control is provided for a car retarder, the stretch of track associated with the retarder is provided with one or more wayside or track circuits which are responsive to a car passing therethrough, and which circuits govern a speed measuring means in such a manner that the car speed as it moves through the retarder is determined, the speed measuring function being continued until the last pair of car wheels leave the retarder.

The foregoing objects, features and advantages of the speed pressure control apparatus of my invention are obtained for a car retarder of the type here contemplated by the provision of a series of leaving speed selectors and a speed pressure selective circuit network. A preferred form of the selector is that of a series of levers or push buttons and a series of repeater relays, one for each push button. Each selector is assigned an individual leaving speed, that is, a speed at which a car should leave the retarder. Thus, there are as many different leaving speeds possible as there are selectors. For example, there may be a series of 6 selectors with each assigned an individual leaving speed selected in the speed range of 3 to 20 miles per hour. The arrangement is such that when a push button of a selector is operated to select a leaving speed, the corresponding repeater relay is energized and retained energized until a new leaving speed is selected by the operation of a different push button. The push buttons and the repeater relays are interconnected so that if more than one push button is pressed at a time accidentally, the lowest leaving speed of the push buttons pressed is the one made effective.

The speed pressure selective circuit network is made up of two networks. The first of these networks includes an initial pressure and a partial pressure control panel or terminal board and contacts of the repeater relays of the selectors. The control panel is provided with repeater relay jacks and car retarder pressure control jacks. These jacks are grouped and interconnected with repeater relay contacts in such a manner as to enable circuits to be set up which select any one of several different initial pressures for the retarder when a car enters the retarder. Also, it permits circuits to be selected for any one of several different partial pressures to which the initial pressure is reduced for each of the series of different leaving speeds. This panel arrangement and the associated circuits enable the selections desired to be set up by plug connectors or jumpers and the selections can be changed from time to time as the operation of the retarder requires without any change in the circuits except for the changing of the plug connectors.

The second circuit network includes another control panel or terminal board having repeater relay jacks and speed selection jacks grouped thereon together with repeater relay contacts and contacts of a car speed measuring means. This network enables circuits to be set up by plug connectors or jumpers for any one of a series of partial pressure release speeds and full release speeds for each of the leaving speeds provided by the selectors.

I shall described one form of apparatus embodying my invention and shall then point out the novel features thereof in claims.

In the accompanying drawings, Figs. 1a, 1b and 1c when placed side by side in the order named, with Fig. 1a at the left, are a diagrammatic view showing one form of apparatus embodying my invention when used with an electropneumatic car retarder. Fig. 2 is a diagrammatic view showing a jack and plug connector that may be used with the apparatus of Figs. 1a, 1b and 1c.

Figures 1A, 2:
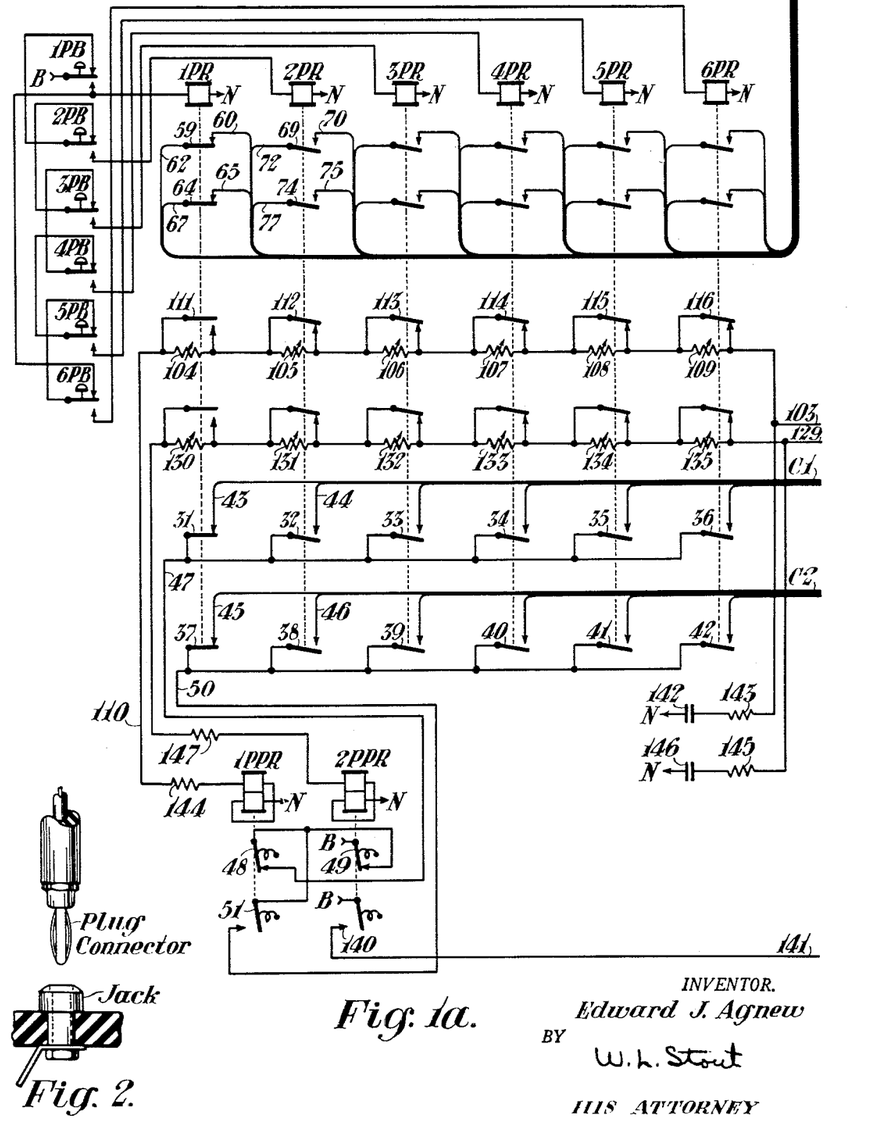
Figure 1B:
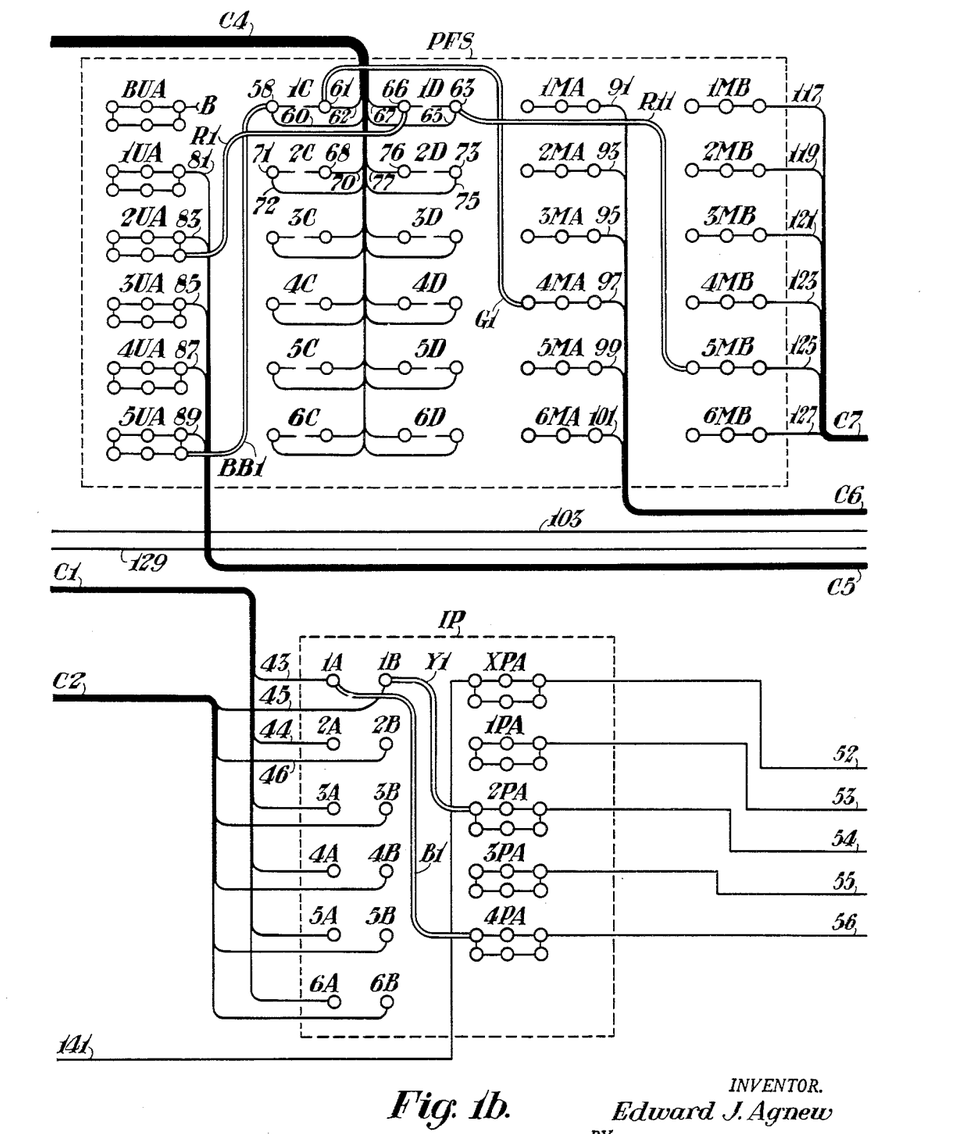
Figure 1C:
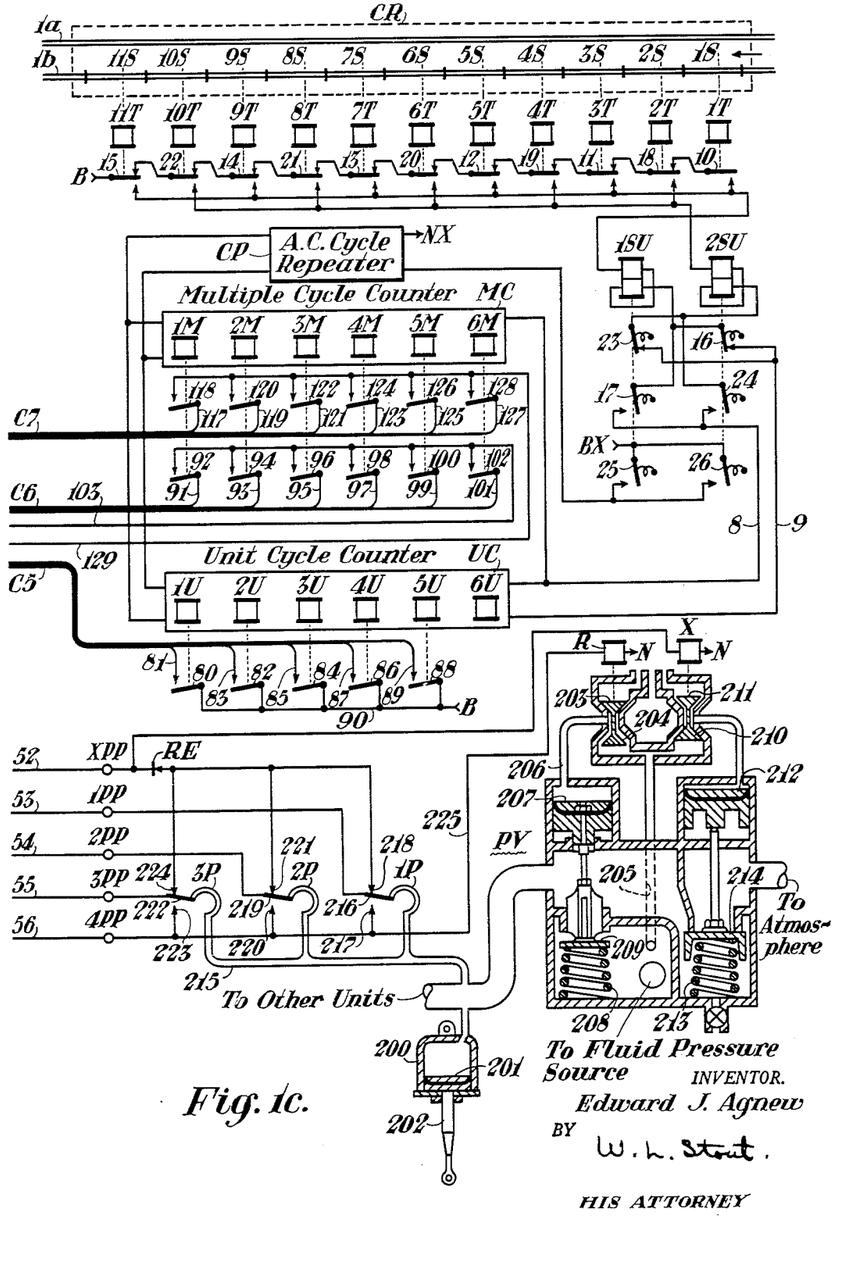

Referring to the drawings, the reference characters 1a and 1b designate the track rails of a stretch of railway track provided with a car retarder shown conventionally by a dotted rectangle CR. The retarder CR may be of any one of several different arrangements and may, for example, be similar to the widely used electropneumatic mechanism disclosed in Letters Patent of the United States No. 1,927,201, granted September 19, 1933, to Herbert L. Bone, for Railway Braking Apparatus, and reference is made to that patent for a full description of the retarder here contemplated. In the present application only the portion of the retarder mechanism sufficient for a full understanding of the invention is shown for the sake of simplicity and the mechanism will be described briefly. In Fig. 1c, a cylinder 200 is that of one of the independent operating units of the braking bars, each of the other operating units having a similar cylinder to which pressure is applied or exhausted in multiple with cylinder 200. The cylinder 200 contains a piston 201 attached to a piston rod 202, the outer end of which is adapted to be connected to the braking bars through a linkage, not shown. When fluid pressure is admitted to the cylinder 200, above the piston 201, the piston is forced downward and the braking bars are moved to the braking position. When the pressure from the cylinder is exhausted to atmosphere, the braking bars and linkage are spring biased to the released or nonbraking position and the piston 201 is moved to the top of the cylinder. The supply of pressure to the cylinder 200 is controlled by a pneumatic control valve PV, which in turn is controlled by two magnet valves X and R. Normally, that is, when no car is moving through the retarder, the braking bars are held at the braking position by full pressure in the cylinder 200, the full pressure being compressed air of the pressure of the order of 100 pounds per square inch. Under this normal condition, the magnet valve R is energized and the magnet valve X is deenergized. With magnet valve R energized, its valve 203 is closed and its valve 204 is open. At this time pressure is admitted through ports 205 and 206 from the source to the chamber above the piston 207 of the pneumatic valve PV forcing this piston downward against the force of a biasing spring 208 and thereby opening a valve 209 and admitting pressure from the source of supply to the cylinder 200. With the magnet X deenergized, its valve 210 is closed and its valve 211 is open. With valve 211 open, the chamber above the piston 212 of the valve PV is exhausted to atmosphere and the piston 212 is forced upward by a bias spring 213, closing a valve 214 and thereby closing the exhaust port of the cylinder 200.

When the magnet valve X is energized and the magnet valve R is deenergized, the pressure above the cylinder 207 of the control valve PV is exhausted to atmosphere through the now open valve 203 and in turn the valve 209 is closed to blank the supply of pressure from the source to the cylinder 200. Also, pressure is now admitted above the piston 212 and it is forced downward to open valve 214 and open the port for exhausting the pressure in the cylinder 200 to atmosphere.

The two magnet valves R and X are controlled in part by a group of pressure responsive devices 1P, 2P and 3P, each of which comprises a Bourdon tube connected in multiple by a pipe 215 to the port leading to the cylinder 200. Each Bourdon tube actuates a contact member between a first and a second position. For example, the tube 1P actuates a contact member 216 to a first position, that is, downward from the position shown in Fig. 1c and to where it engages a stationary contact 217, and to a second position, that is, the position shown in the drawing, where it engages a stationary contact 218. Similarly, the tube 2P actuates a contact member 219 between a first position contact 220 and a second position contact 221; and the tube 3P actuates a contact member 222 between a first position contact 223 and a second position contact 224.

These pressure regulating tubes are constructed and adjusted so as to successively operate as the pressure applied to the cylinder 200 increases. For example, for all pressures below 25 pounds per square inch applied to cylinder 200, the first position contact of each tube 1P, 2P and 3P is closed. If the pressure exceeds 25 pounds per square inch, the contact 216—217 of tube 1P is open, and if the pressure exceeds 35 pounds per square inch the second position contact 216—218 of the tube 1P is closed. Again, the first position contact 219—220 of the tube 2P is open when the pressure exceeds 50 pounds per square inch and its second position contact 219—221 is closed when the pressure exceeds 60 pounds per square inch. Also, the first position contact 222—223 of the tube 3P is opened when the pressure exceeds 75 pounds per square inch and its second position contact 222—224 is closed when the pressure exceeds 85 pounds per square inch.

The car retarder CR is provided with a group of circuit terminals XPP, 1PP, 2PP, 3PP and 4PP to which terminals positive energy is selectively applied for control of the magnet valves R and X. It is to be seen that when positive energy is normally applied to the terminal 4PP in a manner to appear later, the magnet valve R is energized over wire 225 and the above described normal full pressure condition of the retarder is set up. If positive energy is removed from terminal 4PP and applied to terminal XPP, the magnet X is energized and the magnet R is deenergized and the pressure applied to the cylinder 200 is exhausted so that the car retarder is operated to its open or released position, each of the pressure tubes 1P, 2P and 3P assuming their first position under this condition. If now, positive energy is removed from terminal XPP and applied to terminal 1PP, the magnet X is deenergized and the magnet R is energized through the first position contact 216—217 of tube 1P and the full pressure of the source is applied to cylinder 200. When the pressure builds up to about 25 pounds per square inch, the contact 216—217 is opened and the magnet R is deenergized, and the pressure of approximately 25 pounds per square inch is retained in the cylinder 200. In case the pressure in cylinder 200 continues to increase and exceeds 35 pounds per square inch, the contact 216—218 of tube 1P is closed and the magnet X is energized through a path including a half wave rectifier element RE, and with magnet X thus energized the pressure in the cylinder 200 is exhausted until the pressure is less than 35 pounds per square inch and the contact 216—218 is opened to interrupt the energy being supplied to magnet X. If the pressure in cylinder 200 falls below 25 pounds so that the contact 216—217 is reclosed, the magnet R is energized to reapply pressure to the cylinder 200. It follows that when energy is applied to terminal 1PP of the car retarder, the pressure applied to the car retarder is maintained between 25 and 35 pounds per square inch.

When positive energy is applied to terminal 2PP, the magnet R is energized through the first position contact 219—220 of the tube 2P and full pressure is applied to the cylinder 200. At this time, the pressure applied to the cylinder 200 is maintained between 50 and 60 pounds per square inch by tube 2P, the tube functioning in substantially the same manner as the tube 1P functioned to maintain the pressure of cylinder 200 between 25 and 35 pounds.

Again, if positive energy is applied to terminal 3PP, the magnet R is energized through the first position contact 222—223 at tube 3P and pressure is applied to the cylinder 200 and then the pressure is maintained between 75 and 85 pounds per square inch by the action of the tube 3P. To sum up, therefore, when positive energy is applied to terminal 4PP the full pressure of the source is applied to the cylinder 200, when positive energy is applied to terminal XPP the pressure is exhausted and the retarder is opened, when positive energy is applied to terminal 1PP a pressure between 25 and 35 pounds is applied to the retarder, when positive energy is applied to terminal 2PP the pressure applied to the car retarder is between 50 and 60 pounds per square inch, and when positive energy is applied to terminal 3PP a pressure between 75 and 85 pounds is applied to the retarder.

In manual control of the retarder, a manual operable selector lever operable to different circuit controlling positions is provided whereby the operator can selectively apply energy to any one of the control terminals of the car retarder. However, when the pressure applied to the retarder is to be controlled automatically then the manual control means is disconnected and apparatus embodying my invention used for controlling the energy applied to the car retarder terminals. Since manual control is not here contemplated and automatic control is to be used, the manual control circuits are not shown for the sake of simplicity. The manner of selectively applying positive energy to this group of control terminals of a car retarder automatically will now be taken up.

Since automatic control of a retarder involves the determining of the speed of the car moving through the retarder, the speed of a car moving through this associated stretch of track is repeatedly determined by any suitable arrangement, the specific structure of such speed measuring means forming no part of my present invention. As here shown, the speed determining means includes track circuits and a time measuring device. The track circuit arrangement here disclosed is substantially that disclosed and claimed in a copending application for Letters Patent of the United States, Serial No. 283,931, filed the same day as the current application by David P. Fitzsimmons for Railway Car Speed Determining and Control Apparatus, these two applications being of common ownership. Reference is made to the foregoing Fitzsimmons application for a full description of the track circuit arrangement here contemplated and it is here described only to the extent needed to understand its relationship to my invention. This stretch of track associated with the retarder CR is formed with a series of track sections 1S to 11S, inclusive, by insulated rail joints placed in the rail 1b, the rail 1a being electrically continuous and common to all of the track sections. The sections are relatively short and are of the same length, a length of the order of 3 feet 1½ inches being suitable for the form of car retarder here contemplated and also this length is such that only one pair of car wheels can occupy a section at a time. Obviously, other arrangements of these sections can be used. Each section is provided with a normally energized track circuit having a track relay identified by the reference character T plus a numeral corresponding to the section. As explained in the aforementioned Fitzsimmons application, each track relay is controlled by a holding or stick circuit, a shunting circuit and a pickup or reset circuit. The holding circuit for each track relay includes a front contact of the relay and a front contact of all the following track relays except the relay for the last or leaving section 11S. The shunting circuit for each track relay includes the track rails of the corresponding section so that the relay is shunted and released in response to a pair of car wheels occupying the section. The reset circuit is such that the relays are picked up in cascade and a relay can be picked up only when all the relays in the rear are picked up. This control of the track relays assures that the track relays are successively released in response to the leading pair of car wheels passing through the sections and the control is passed to the next pair of wheels in the rear when the leading pair of wheels leave the last section and this control is then successively passed to the other pairs of car wheels until the last pair of wheels of the car leave the last section.

These track circuits are used to control two normally deenergized relays 1SU and 2SU, these relays being of a bias polar type and alternately energized as the car moves through the series of sections. To this end the relay 1SU is energized by a circuit which includes positive terminal B of the current source, back contacts 10, 11, 12, 13, 14 and 15 in multiple of the odd numbered track relays 1T, 3T, 5T, 7T, 9T and 11T, respectively, a front contact of each of the remaining relays in advance of the shunted relay, and thence the circuit extends through the winding of the relay and to the negative terminal N of the source through reverse contact 16 of relay 2SU, wire 9 and the starting circuit of a time measuring means to be referred to shortly. This circuit for relay 1SU is provided with an alternative path which includes normal contact 17 of the relay, wire 8 and the holding or operating circuit of the time measuring means. Similarly, the control relay 2SU is provided with an energizing circuit that includes the positive terminal B of the source, back contacts 18, 19, 20, 21 and 22 of the even numbered track relays 2T, 4T, 6T, 8T and 10T, respectively, front contacts of the track relays in advance of the shunted relay, the winding of the relay, a reverse contact 23 of relay 1SU, wire 9 and the starting circuit of the time measuring means. The relay 2SU is also provided with an alternate circuit path that includes its own normal contact 24 and the operating or holding circuit of the time measuring means. It follows that when a car moves through the sections 1S to 11S, the relays 1SU and 2SU are alternately energized and deenergized, the relay 1SU being energized and operated to its normal position as the leading pair of wheels of the car move through each of the odd numbered track sections and the relay 2SU being energized and operated to its normal position as the leading pair of car wheels move through each of the even numbered track sections.

Control relays 1SU and 2SU are used to control a time measuring means to determine the car speed in each of the track sections by determining the time consumed by a pair of car wheels in moving through each individual section. This time measuring means may take any one of several different forms of the type which is biased to an initial position and is operated to an extreme position at a given rate when supplied with current, it being immediately reset to its initial position from whatever position it has advanced when the supply of current is interrupted. Hence, with the operation of the time measuring means initiated when the leading pair of wheels enter the sections 1S to 11S successively, the speed of the car in each of the sections is determined by the extent the time measuring means is operated while the car occupies that section.

The time measuring means here shown is that covered in Letters Patent of the United States No. 2,320,802, granted June 1, 1943, to Clarence S. Snavely, for Railway Braking Apparatus and reference is made to that patent for a complete description of the time measuring means here contemplated.

It is sufficient for the present application to describe the time measuring means only briefly. This time measuring means is an alternating current cycle counting device comprising a source of alternating current, an alternating current cycle repeater CP, a unit cycle counter UC and a multiple cycle counter MC. The alternating current source, the terminals of which are indicated at BX and NX, may be a 60 cycle source but other frequencies can be used. The cycle repeater CP includes quick acting relays and rectifiers, the relays being operated to alternately close contacts in step with the cycles of the alternating current. That is, a pair of contacts are alternately closed and opened, each contact being closed 1/60 of a second and then opened for a like period. The unit cycle counter UC includes a chain of 6 relays 1U to 6U, inclusive. This chain is connected to the cycle repeater CP and the relays operated one after the other by the current impulses created by the operation of the contacts of the cycle repeater. Thus, the action of the chain is advanced by one relay each cycle of the operating current. The relays of the chain are interconnected so that when the count of six is exceeded the chain doubles back and continues to count over and over again. The multiple cycle counter MC includes a chain of six counting relays 1M to 6M, inclusive. This chain is connected to the unit cycle chain UC in such a manner as to progressively pick up the relays one each time the unit chain completes a round trip operation. Thus, the six relays of the multiple counter MC are all picked up in response to six round trip operations of the unit cycle UC. That is, the relays of the counter MC are all picked up in response to 36 cycles of the alternating current. It follows that the extreme position of the time measuring means is reached in seven round trip operations of the unit cycle counter UC and a count of 42 cycles of alternating current is made, the total time being 7/10 seconds or 700 milliseconds. It is to be observed that the particular relays of the two chains UC and MC which are picked up at any instant are a measure of the time consumed after the initiating of the operation. Alternating current is supplied from the source to the time measuring means through a simple circuit that includes in multiple normal contacts 25 and 26 of the two control relays 1SU and 2SU, respectively. Consequently, with the relays 1SU and 2SU energized alternately as a pair of car wheels move through the track sections 1S to 11S, a new operation of the time measuring means is initiated for each track section and the speed of the car in each section is determined by the extent to which the relays of the two chains UC and MC are operated. For example, if the relays 6M and 6U are picked up while a pair of car wheels move through the 3 feet 1½ inches of a track section, the average speed of the car in that section is approximately 3.1 miles per hour. Again, if only the relay 1M is picked up while a pair of car wheels move through a track section the average speed is approximately 21.3 miles per hour. Hence, this time measuring means is capable of measuring a range of speeds from 3 to 20 miles per hour for each section associated with the car retarder.

As previously explained, there are different correct speeds for car units to leave the retarder and it is desirable to vary the initial pressure applied to the retarder as a car enters the retarder according to the selected leaving speed. Also, it is desirable to have the partial pressure to which the initial pressure is reduced as the car slows down to the requested leaving speed vary with the requested or selected leaving speed. Furthermore, it has been pointed out that it is desirable to preselect the partial pressure release speed and the full release speed for each leaving speed. According to my invention, pressure and speed selections are accomplished by a group of leaving speed selectors and a speed pressure selective network which includes contacts operated by the speed measuring device.

Referring to Fig. 1a, the leaving speed selectors include a series of six push buttons, 1PB to 6PB, inclusive, and a series of six repeater relays 1PR to 6PR, inclusive, there being a repeater relay for each push button. These push buttons or levers are operable to a normal and a reverse position and are provided with a normal and a reverse position contact. This series of push buttons is preferably of the gang type interlocked so that when one push button is pressed to its reverse position it remains in that position until another push button is pressed when the first push button is operated back to its normal position. These push buttons are assigned individual leaving speeds. For example, the leaving speeds of 4, 5, 6, 7, 8 and 9 miles per hour may be assigned to the push buttons 1PB, 2PB, 3PB, 4PB, 5PB and 6PB, respectively. The invention is not limited to this series of six leaving speeds, but these speeds are used for illustration and other leaving speeds can be assigned. Also, a greater or a less number of selectors can be used.

Each of the repeater relays is energized over a circuit that includes the reverse position contact of the corresponding push button and in series the normal position contacts of all the push buttons ahead of that one. For example, the circuit for the repeater relay 6PR extends from terminal B of the current source through normally closed contacts of the push buttons 1PB to 5PB, inclusive, the reverse position contact of push button 6PB, and winding of relay 6PR to terminal N of the current source. Each of the remaining repeater relays is provided with an energizing circuit similar to that just described for the relay 6PR. It is to be observed that the relay 1PR is normally energized by a circuit that includes the normally closed contacts of each of the push buttons in series, and the relay 1PR can also be energized by the circuit that includes the reverse position contact of the push button 1PB. Thus, the lowest leaving speed of 4 miles per hour is normally requested as well as being requested when the push button 1PB is actuated. This interconnection of the repeater relay circuits assures that if two or more push buttons are pressed accidentally at the same time the relay corresponding to the lowest leaving speed of the operated push buttons is the only one energized and the circuits are of the safety type and a mistake in the operation will result in the lowest leaving speed being designated. Contacts of this series of repeater relays are used in the circuit network as will appear hereinafter.

The speed pressure selective network or means includes a first or initial and partial pressure selective network, and a second or partial pressure release speed and full release speed selective network. The first one of these networks, that is, the initial and partial pressure network, comprises a control panel or terminal board indicated as a whole by the dotted rectangle IP (see Fig. 1b) and contacts of the repeater relays. The control panel IP is of suitable insulating material and is provided with two series of six repeater relay jacks 1A to 6A, inclusive, and 1B to 6B, inclusive. These jacks are alike in construction and are of such a construction as to be mounted in the panel for wires to be attached thereto at the rear of the panel and for the insertion of a plug cord connector or jumper at the front of the panel, this jack and plug connector construction being shown in Fig. 2. The first series of jacks 1A to 6A is for initial pressure selection and the second series of jacks 1B to 6B is for partial pressure selection. Each jack of each of the two series is connected to a front contact of the corresponding repeater relay, the jacks 1A to 6A being connected to front contacts 31 to 36, inclusive, of the relays 1PR to 6PR, respectively, through a cable C1. In like manner, the jacks 1B to 6B of the partial pressure series are connected to front contacts 37 to 42, inclusive, of the relays 1PR to 6PR, respectively, through a cable C2. For example, the jack 1A is connected to front contact 31 of relay 1PR by wire 43 in cable C1, jack 2A is connected to front contact 32 of relay 2PR by wire 44 in cable C1, and so on for the remaining jacks 3A to 6A. In like manner, the jack 1B is connected to front contacts 37 of relay 1PR by wire 45 in cable C2, jack 2B is connected to front contact 38 of relay 2PR by wire 46 in cable C2, and so on for the jacks 3B to 6B. The heels of the front contacts 31 to 36 of the relays are connected to a common wire 47 which in turn is connected to the positive terminal B of the current source through reverse contacts 48 and 49 of relays 1PPR and 2PPR, respectively, these two control relays being referred to hereinafter. Similarly, the heels of the front contacts 37 to 42 of the repeater relays are connected to a common wire 50 which in turn is connected to the positive terminal B of the current source through normal contact 51 of relay 1PPR and reverse contact 49 of relay 2PPR. It is to be seen from the foregoing that normally, that is, when repeater relay 1PR is picked up closing front contact 31, energy is applied to the jack 1A and this energy can be switched from jack 1A to jack 1B when relay 1PPR is operated to its normal position opening contact 48 and closing contact 51. It is clear that positive energy can be applied to any other one of the 1A to 6A series of jacks by selecting a different one of the repeater relays and that energy from any one of these selected jacks of the series 1A to 6A can be switched to the corresponding jack of the series 1B to 6B by operating relay 1PPR to its normal position so that contact 48 is open and contact 51 is closed.

The panel IP is also provided with a series of five groups of jacks with each group consisting of six jacks which are electrically joined at the rear of the panel in any suitable manner. The individual groups of this series of jacks are identified by the reference characters XPA, 1PA, 2PA, 3PA and 4PA, respectively, and are associated with control circuits connected to the terminals of the car retarder. The group XPA is connected to control terminal XPP of the car retarder by a circuit including wire 52, the group 1PA is connected to terminal 1PP of the car retarder by a circuit including wire 53, group 2PA is connected to terminal 2PP by a circuit including wire 54, group 3PA is connected to terminal 3PP by a circuit including wire 55, and the group 4PA is connected to terminal 4PP by a circuit including wire 56. Consequently, any of the pressure conditions of the car retarder CR represented by the terminals XPP, 1PP, 2PP, 3PP and 4PP and their associated circuits can be set up by applying positive energy to the corresponding group of jacks of the control panel IP. It follows that by use of plug connectors or jumpers any one of the car retarder pressure conditions can be initially set up for any one of the six leaving speeds identified by the push buttons 1PB to 6PB by inserting the two ends of a plug connector one end in the jack of the series 1A to 6A and one end in a jack of any one of the group of jacks XPA, 1PA, 2PA, 3PA and 4PA. For example, a plug connector B1 having one end inserted in jack 1A and its other end inserted in a jack of the group 4PA sets up an initial pressure of 100 pounds for the leaving speed of 4 miles per hour. Furthermore, any one of the four pressure conditions of the car retarder can be designated and selected as a partial pressure condition by insertion of a plug connector between the group of jacks 1B to 6B and a jack of any one of the groups XPA to 4PA. For example, a plug connector Y1 inserted in jack 1B and a jack of the group 2PA sets up a partial pressure of 50 pounds for the car retarder for the leaving speed of 4 miles per hour, the initial pressure being, as explained above, selected as 100 pounds per square inch. For reasons to appear hereinafter, positive energy is at times applied to the group of jacks XPA by a simple circuit that includes the normal contact 140 of relay 2PPR and wire 141.

In like manner any one of the four different pressure conditions of the retarder CR can be selected as the initial pressure and the partial pressure for the leaving speed of 4 miles per hour by the insertion of the plug connectors B1 and Y1 in the proper jacks of the panel IP. Also, any one of the four pressure conditions of the retarder can be selected as the initial pressure and the partial pressure for any one of the other five different leaving speeds by insertion of plug connectors in the proper jacks of terminal board IP. Preferably, the plug connectors used for setting up the initial selection are of one color, such as blue, and the plug connectors used for setting up the partial pressure selection are of a different color, such as yellow. A color scheme facilitates the selection and a change in the selection when such is required during the operation of the retarder.

The second or partial and full release speed selective network comprises a control panel indicated as a whole by a dotted rectangle PFS, contacts of the repeater relays and contacts of the time measuring means. The control panel PFS is of suitable insulation material and is provided with different series of jacks which in construction are similar to those mounted on the panel IP. The panel PFS is provided with two series of six groups of repeater relay jacks 1C to 6C, inclusive, and 1D to 6D, inclusive, each group including two independent jacks. The two jacks of each of these groups are connected to a front contact and the mating heel, respectively, of a corresponding repeater relay. For example, the jack 58 of the group 1C is connected to front contact 59 of relay 1PR by wire 60 in a cable C4 and the other jack 61 of the group 1C is connected to the mating heel of the front contact 59 by wire 62 in cable C4. Similarly, a jack 63 of the group 1D is connected to front contact 64 of relay 1PR by wire 65 in cable C4 and the second jack 66 of group 1D is connected to the mating heel of front contact 64 by wire 67 in cable C4. Again, the jack 68 of the group 2C is connected to front contact 69 of relay 2PR by wire 70 in cable C4 and the other jack 71 of the group 2C is connected to the mating heel of the front contact 69 by wire 72 in cable C4. Also, the jack 73 of the group 2D is connected to the front contact 74 of relay 2PR by wire 75 in cable C4 and the other jack 76 of the group 2D is connected to the mating heel of front contact 74 by wire 77 in cable C4.

Similarly, the jacks of the groups 3C, 4C, 5C and 6C and the jacks of the groups 3D, 4D, 5D and 6D are connected to front contacts and the mating heels of the front contacts of relays 3PR, 4PR, 5PR and 6PR over wires in the cable C4 as will be apparent from an inspection of the drawings.

It follows from the foregoing that the two jacks of each of the groups 1C and 1D are electrically connected when the repeater relay 1PR is energized and picked up and in like manner the jacks of each of the groups 2C—2D, 3C—3D, 4C—4D, 5C—5D and 6C—6D are connected when the corresponding repeater relay is picked up in response to a selection of a given leaving speed.

The panel PFS is further provided with a series of six groups of jacks BUA and 1UA to 5UA, inclusive, the jacks of each group of this series being electrically connected at the rear of the panel. Also the panel PFS is provided with two series of six groups of jacks 1MA to 6MA, inclusive, and 1MB to 6MB, inclusive, and the jacks of each of which groups are electrically connected at the back of the panel PFS.

The jacks of groups 1UA to 5UA are associated with relays of the unit cycle counter UC. The jacks of the 1UA group are connected to front contact 80 of relay 1U by wire 81 in cable C5, the jacks of the 2UA group are connected to front contact 82 of relay 2U by wire 83 in cable C5, the jacks of the group 3UA are connected to front contact 84 of relay 3U by wire 85 in cable C5, the jacks of the group 4UA are connected to front contact 86 of relay 4U by wire 87 in cable C5, and the jacks of the group 5UA are connected to front contact 88 of relay 5U by wire 89 in the cable C5. Positive energy from the current source is applied directly to the jacks of the BUA group. The heels of the front contacts 80, 82, 84, 86 and 88 of the relays 1U to 5U, respectively, are connected in multiple by a wire 90 to the positive terminal B of the current source and consequently positive energy is applied to the jacks of the groups 1UA to 5UA according to which one of the U relays in the counting chain UC is picked up while measuring the speed of a car.

The jacks of the group 1MA and the group 1MB are associated with the relays of the multiple cycle counter MC. The jacks of the 1MA group are connected by wire 91 in cable C6 to the heel of a front contact 92 of relay 1M, the jacks of the 2MA group are connected by wire 93 in cable C6 to the heel of the front contact 94 of relay 2M, the jacks of the 3MA group are connected by wire 95 in cable C6 to the heel of front contact 96 of relay 3M, the jacks of the 4MA group are connected by wire 97 in cable C6 to the heel of front contact 98 of relay 4M, the jacks of the group 5MA are connected by wire 99 in cable C6 to the heel of the front contact 100 of relay 5M, and the jacks of the group 6MA are connected by wire 101 in cable C6 to the heel of the front contact 102 of relay 6M.

The front contacts 92, 94, 96, 98, 100 and 102 of the relays 1M to 6M, respectively, are connected in multiple to wire 103 and thence to the winding of the control relay 1PPR by a circuit connection that includes a series of six resistors 104 to 109, inclusive, thence by wire 110 and resistor 144 through the winding of relay 1PPR to terminal N of the current source. The resistors of this series of resistors 104 to 109 are shunted by back contacts 111 to 116, respectively, of the repeater relays 1PR to 6PR, respectively. Thus when any repeater is picked up in response to the selection of the corresponding leaving speed, the corresponding resistor of this foregoing mentioned series of resistors is interposed in the control circuit for the relay 1PPR. The arrangement is such that with positive energy applied to wire 103, the relay 1PPR is effectively energized and is operated to its normal position. It is to be seen, therefore, that with positive energy applied to any one of the group of jacks 1MA to 6MA, then positive energy is applied to wire 103 and the control relay 1PPR is operated when the corresponding relay 1M to 6M of the multiple cycle counter MC is picked up during the process of measuring the speed of a car. For example, if positive energy is applied to a jack of the 3MA group when the repeater relay 1PR is picked up to designate a leaving speed of 4 miles per hour, the control relay 1PPR is energized when relay 3M of the time measuring means is picked up. The group of jacks 1MA—6MA and the associated contacts of the relays 1M to 6M of the multiple cycle counter MC are used to select the partial pressure release speeds for the different leaving speeds by thus controlling the relay 1PPR, it being recalled that the partial pressure condition selected for a leaving speed on the control panel IP is effected when the control relay 1PPR is operated to its normal position to close normal contact 51.

When the relay 1PPR is once operated to its normal position due to the measured speed in a section, it is retained energized at its normal position until the car passes into the next section and a new measurement of the speed is made. To this end a circuit path including a capacitor 142 and a resistor 143 in series are connected in multiple with the path including the winding of relay 1PPR, so that when positive energy is applied to wire 103 the capacitor 142 is charged. Thus, when the time measuring relay chains are reset in response to a car passing into the next section to initiate a new measurement of the speed subsequent to energy having applied to wire 103, the relay 1PPR is retained energized at its normal position by the discharge of the capacitor 142 through resistors 143, 104 and 144 and winding of relay 1PPR. The capacitor 142 is made relatively large to assure that the relay 1PPR is retained energized by the discharge until a new measurement of the speed of the car is effected. Also, the resistor 104 is made adjustable so that the discharge rate of capacitor 142 can be preselected. Likewise, each of the other resistors of the series 104 to 109 is made adjustable so that the discharge rate for capacitor 142 can be preselected according to the different requested leaving speeds.

The jacks of the group 1MB to 6MB are used to select the full release speed for the car retarder and to this end the jacks of the group 1MB are connected by wire 117 in cable C7 to the mating heel of front contact 118 of relay 1M, the jacks of the group 2MB are connected by wire 119 in cable C7 to the heel of front contact 120 of relay 2M, the jacks of the group 3MB are connected by wire 121 in cable C7 to the heel of front contact 122 of relay 3M, the jacks of the group 4MB are connected by wire 123 in cable C7 to the heel of front contact 124 of relay 4M, the jacks of the group 5MB are connected by wire 125 in cable C7 to the heel of front contact 126 of relay 5M, and the jacks of the group 6MB are connected by wire 127 in cable C7 to the heel of front contact 128 of relay 6M. This series of front contacts of the relays 1M to 6M are connected to a wire 129 which is connected in turn to relay 2PPR by a series of resistors 130 to 135, inclusive, resistor 147, winding of relay 2PPR, and terminal N of the current source. The resistors 130 to 135 are shunted one by a back contact of each of the repeater relays as will be apparent by an inspection of the drawing. The arrangement is such that with positive energy applied to wire 129, the control relay 2PPR is effectively energized and operated to its normal position. It follows from the foregoing that with positive energy applied to the jacks of any one of the groups 1MB to 6MB, then positive energy is applied to wire 129 and hence to the relay 2PPR when the corresponding relay 1M to 6M of the speed measuring means is picked up during the process of measuring the speed of the car. It will be recalled that with relay 2PPR operating to its normal position, closing contact 140, positive energy is applied to the jacks of the XPA group of the control panel IP and in turn applied to the terminal XPP of the car retarder with the result the car retarder is released.

The relay 2PPR is retained energized at its normal position when it has once been energized due to positive energy applied to wire 129 in response to the measured speed of a car in a section, until a new measurement of the speed of the car in the next section is completed. This is effected by a circuit path including a resistor 145 and a capacitor 146 in series connected to wire 129 in multiple with the path through the winding of relay 2PPR. Thus, when positive energy is applied to wire 129 and relay 2PPR operated, the capacitor 146 is charged. Then when the speed measuring relay chains are reset to initiate a new measurement of the car speed as the car enters the next section, the relay 2PPR is retained energized by the discharge of capacitor 146 through resistors 145, 130 and 147 and winding of relay 2PPR. The capacitor 146 is relatively large and the resistor 130 is adjustable to assure that relay 2PPR is retained energized until a new measurement of the speed of the car is determined when the car is moving at a speed corresponding to the requested leaving speed of push button 1PB and relay 1PR.

Similarly, each of the other resistors of the series 130 to 135 is proportioned and made adjustable so that the discharge rate of capacitor 146 can be preselected according to the different requested leaving speeds.

It is to be noted that the relays 1PPR and 2PPR are provided also with stick circuits that are controlled by cancellation relays not shown. These stick circuits would be those shown in the aforementioned Fitzsimmons application and are not here shown for the sake of simplicity, because they are not a part of my invention.

Therefore, the network comprising the control panel PFS and associated contacts of the repeater relay and contacts of the relays of the speed measuring means, together with the control relays 1PPR and 2PPR provide means whereby different partial pressure release speeds and full release speeds can be selected for each of the different leaving speeds of the push button bank by plug connectors inserted in properly selected jacks of the PFS panel. For example, assuming that for a leaving speed of 4 miles per hour the initial pressure of 100 pounds is selected by the plug connector B1 and a partial pressure of 50 pounds selected by plug connector Y1, it is desired to have the partial pressure effected at 4.5 miles per hour and full release effected at approximately 4 miles per hour. The partial pressure release speed can be set up by a plug connector BB1 inserted between a jack of the 5UA group and jack 58 of the 1C group, and a second plug connector G1 inserted in jack 61 of the 1C group and a jack of the 4MA group. This partial pressure release speed will be effected because the relays 5U and 4M of the time measuring means are picked up at a speed of 4.5 miles per hour. With the plug connectors BB1 and G1 thus inserted, positive energy is applied to the relay 1PPR which operates to its normal position to close normal contact 51. Positive energy is then applied through the plug connector Y1 to a jack of the group 2PA and in turn to the terminal 2PP of the car retarder. To select the full release speed of 4 miles per hour a plug connector R1 is inserted in a jack of the 2UA group and jack 66 of the group 1D and a second plug connector R11 is inserted between jack 63 of the 1D group and a jack of the group 5MB. Positive energy is then applied to relay 2PPR when relays 2U and 5M of the speed measuring means are picked up in response to a car speed of 4 miles per hour. With the relay 2PPR thus energized and operated to its normal position to close contact 140, positive energy is applied to the jacks of the group XPA and in turn applied to the control terminal XPP of the car retarder and the retarder release.

It is apparent that any partial pressure release speed within the limits of the speed measuring means can be selected for any of the leaving speeds designated by the push buttons by means of plug connectors similar to the connectors BB1 and G1 being inserted in jacks of the series 1UA to 5UA, jacks of the series 1C to 6C, and the jacks of the 1MA to 6MA series. Also, that full release speeds corresponding to the leaving speeds of the push buttons can be selected by plug connectors similar to the plug connectors R11 and R1 inserted in jacks of the 1UA to 5UA series, jacks of the 1D to 6D series, and jacks of the 1MB to 6MB series. Furthermore, it is apparent that any selection can be quickly and easily changed to another selection by changing the jacks into which the plug connectors are inserted. To facilitate the changing in the selection of the partial pressure release speed and full release speed, a color scheme is preferred for the plug connectors. For example, the connectors used for selecting the partial pressure release speed may be green and the plug connectors for selecting the full release speed may be red.

Car retarder speed pressure selective control apparatus here provided has the advantages that leaving speeds can be set up that will assure satisfactory movement of the different car units to the classification tracks and an initial pressure and a partial pressure can be set up at each of the leaving speeds that will insure satisfactory movement of the car units through the retarder. The partial pressure release speed is automatically assured for the different leaving speeds and these various selections and conditions can be quickly and readily changed or modified when operations of the car retarder require.

Although I have herein shown and described but one form of car retarder speed pressure selective control apparatus embodying my invention, it is understood that various changes and modifications may be made within the scope of the appended claims without departing from the spirit and scope of my invention.

Having thus described my invention, what I claim is:

1. In combination, a stretch of railway track provided with a car retarder having several different braking pressure conditions, a series of control circuits connected to said retarder one for each of said braking pressure conditions, a series of selectors one for each of several different assigned leaving speeds for the retarder, each said selector operable to a first and a second position and said series of selectors having a first and a second series of contacts closed at the second position; a control panel having a series of initial braking pressure condition jacks, a series of partial braking pressure condition jacks and a series of groups of control circuit jacks; said initial braking pressure condition jacks connected one to each of the first series of contacts of said selectors, said partial braking pressure condition jacks connected one to each of the second series of contacts of said selectors, said series of groups of control circuit jacks connected one group to each of said control circuits, a current source, a control relay, circuit means including contacts of said control relay to connect said source to said first or second series of contacts of said selectors according as the control relay is operated to a reverse or a normal position, selective circuit means including said jacks and said first and second series of contacts to enable an initial braking pressure condition and a partial braking pressure condition to be selected from said several different retarder braking pressure conditions for each of said different leaving speeds, and means connected to said control relay to selectively operate it to its reverse or to its normal position.

2. In combination, a stretch of railway track provided with a car retarder having several different braking forces, a series of control circuits connected to said retarder one for each of said braking forces, a series of selectors one for each of several different assigned leaving speeds for the retarder, each said selector operable to a first and a second position and said series of selectors having a first and a second series of contacts closed at the second position; a control panel having a series of initial braking force jacks, a series of partial braking force jacks and a series of groups of control circuit jacks; said initial braking force jacks connected one to each of the first series of contacts of said selectors, said partial braking force jacks connected one to each of the second series of contacts of said selectors, said series of groups of control circuit jacks connected one group to each of said control circuits, a current source, a control relay, circuit means including contacts of said control relay to connect said source to said first or second series of contacts of said selector according as the control relay is operated to a reverse or a normal position, selective circuit means including said jacks and said first and second series of contacts to enable an initial braking force and a partial braking force to be selected from said several different retarder braking forces for each of said different leaving speeds, a speed determining means including a track circuit connected to the rails of said stretch and a time measuring device controlled by said track circuit and having contacts which are progressively operated to determine car speeds in said stretch, and circuit means including contacts of said device connected to said control relay to operate the control relay to its reverse or normal position according to the determined car speed.

3. In combination, a stretch of railway track provided with a car retarder having at least four different braking forces and a full release condition, four control circuits connected to said retarder one for each of said braking forces and a fifth circuit for said full release condition, a series of six selectors one for each of six assigned leaving speeds for the retarder, each said selector operable to a first and a second position and having second position contacts, said selector contacts being arranged in a first and a second series with each series including a contact of each selector, a control panel having a series of six initial braking force jacks, a series of six partial braking force jacks and a series of five groups of control circuit jacks; said initial braking force jacks connected one to each of said first series of selector contacts, said partial braking force jacks connected one to each of said second series of selector contacts, said groups of control circuit jacks connected one group to each of said braking force control circuits and the fifth group to said full release control circuit, a current source, a first and a second control relay, means including contacts of said first control relay to connect said source to said first and second series of selector contacts according as that control relay is reverse or normal, means including a normal contact of said second control relay to connect said source to said fifth group of jacks, selective circuit means including said jacks and said first and second series of contacts to enable an initial braking force and a partial braking force to be selected from each of said four retarder braking forces for each of said six leaving speeds, a speed determining means including a track circuit connected to the rails of said stretch and a time measuring device controlled by said track circuit and having contacts which are progressively closed to determine car speeds in said stretch when the track circuit is shunted, and means including said contacts of said device connected to said control relays to operate the relays to reverse and normal positions according to the determined car speed.

4. In combination, a stretch of railway track provided with a car retarder which has several different braking pressures, a series of control circuits connected to said retarder one for each of said braking pressures, a speed determining means including a track circuit connected to the rails of said stretch and a time measuring device having contacts which are progressively closed as the device is operated, said device connected to said track circuit and operated to determine car speeds by the extent its contacts are closed when the track circuit is shunted, a group of control relays, circuit means including contacts of said device connected to said relays to selectively operate the relays according to the determined speed, a series of selectors one for each of a series of assigned leaving speeds for said retarder, each said selector operable to a first and a second position and having contacts closed at the second position, a current source, means including contacts of said control relays to connect said source to either a first or a second series of second position contacts of said selectors; a control panel having a series of initial braking pressure jacks, a series of partial braking pressure jacks and a series of groups of control circuit jacks; said series of initial braking pressure jacks connected one to each of said first series of selector contacts, said series of partial braking pressure jacks connected one to each of said second series of selector contacts, said series of groups of jacks connected one group to each of said control circuits, and selective circuit means including said first and said second series of contacts and said jacks to enable an individual initial braking pressure and an individual partial braking pressure to be selected for each of said leaving speeds whereby said retarder may be automatically positioned according to a selected leaving speed and the measured car speed.

5. In pressure control apparatus for a car retarder having several different pressure conditions to which it can be operated, the combination comprising, a series of control circuits connected to said retarder one for each of the several different pressure conditions, a series of several selectors one for each of several different car retarder leaving speeds, each said selector operable to a first and a second position and having second position contacts; a control panel having a series of initial pressure jacks, a series of partial pressure jacks and a series of groups of control circuit jacks, said series of initial pressure jacks connected one to each of a first series of second position contacts of said selectors, said series of partial pressure jacks connected one to each of a second series of second position contacts of said selectors, said series of groups of control circuit jacks connected one group to each of said control circuits, selective circuit means including said jacks and said first and second series of second position contacts to enable an individual initial pressure circuit and an individual partial pressure circuit to be set up for each said leaving speed, a current source, and circuit control means operable to different positions to connect said current source either to said first or to said second series of selector contacts.

6. In pressure control apparatus for a car retarder having a full pressure, a first, a second and a third partial pressure and a full release pressure condition, the combination comprising; a full pressure, a first, a second and a third partial pressure and a full release car retarder control circuit; a series of six selectors one for each of six different car retarder leaving speeds, each said selector operable to a first and a second position and having second position contacts, said selector contacts being arranged in a first and a second series with each series including a contact of each selector; a control panel having a series of six initial pressure jacks, a series of six partial pressure jacks and a series of five groups of pressure control jacks; said six initial pressure jacks connected one to each of said first series of selector contacts, said six partial pressure jacks connected one to each of said second series of selector contacts, said group of pressure control jacks connected one group to each of said control circuits, means to selectively connect said initial pressure jacks and said partial pressure jacks to any one of said groups of jacks to enable an individual initial pressure circuit and an individual partial pressure circuit to be set up for each of said six leaving speeds, a current source, and a control means operable to different positions to connect said current source either to said first series or to said second series of selector contacts.

7. In pressure control apparatus for a car retarder having a full pressure, a first, a second and a third partial pressure and a full release pressure condition; the combination comprising, a full pressure, a first, a second and a third partial pressure and a full release control circuit connected to the retarder, a series of six selector levers one for each of a series of six different car retarder leaving speeds, each said lever operable to a first and a second position and having first position and second position contacts, a series of six repeater relays one for each said lever, each said relay having an energizing circuit including a second position contact of the corresponding lever and a first position contact of each of the other levers ahead in the series in turn; said relays having a first and a second series of front contacts with each relay having a front contact in each said series; a control panel having a series of six initial pressure jacks, a series of six partial pressure jacks, and a series of groups of control circuit jacks; said series of initial pressure jacks connected one to each of said first series of repeater relay front contacts, said series of six partial pressure jacks connected one to each of said second series of repeater relay front contacts, said series of groups of jacks connected one group to each said pressure control circuit, a current source, a first and a second control relay each having a reverse and a normal position, circuit means including contacts of said first control relay to connect said source to the heels of said first series of repeater relay front contacts or to the heels of said second series of repeater relay front contacts according as said first control relay is reverse or normal, other circuit means including a normal contact of said second control relay to connect said source to said group of jacks for said full release control circuit, selective means to connect each of said initial and partial pressure jacks to any one of said groups of jacks to enable an initial pressure condition and a partial pressure condition to be selected from said control circuits for each of said retarder leaving speeds, and means connected to said control relays to selectively govern the control relays to their reverse and normal positions.

8. In pressure control apparatus for a car retarder having a series of several different pressure conditions, the combination comprising, a series of car retarder control circuits one for each of several different pressure conditions, a series of several selector levers which are numbered in a given ascending order and assigned different car retarder leaving speeds which speeds progressively increase in the ascending order of the numbering of the levers, each said lever operable to a first and a second position and having first position and second position contacts, a series of repeater relays one for each said lever, each said relay having an energizing circuit including a second position contact of the corresponding lever and a first position contact of the levers ahead in the ascending order of their numbering, the number one relay being also provided with a normal energizing circuit including in series a first position contact of each said lever to thereby normally assign the lowest leaving speed; a control panel having a series of initial pressure jacks one for each said lever, a series of partial pressure jacks one for each said lever, and a series of groups of jacks one group for each said control circuit; said series of initial pressure jacks connected each to a front contact of the repeater relay for the corresponding lever, said series of partial presure jacks connected each to a front contact of the repeater relay for the corresponding lever, said series of groups of jacks connected one group to each of said control circuits, and selective circuit means to enable an individual initial pressure and an individual partial pressure circuit condition to be selected for each of said leaving speeds by connecting selected jacks of said control panel.

9. In a pressure actuated car retarder having full pressure, three different partial pressure and full release pressure conditions and which retarder is located at a stretch of railway track formed with a series of track circuits, the combination comprising, a time measuring means having an initial position and an extreme position toward which it is operated when supplied with current; said time measuring means provided with a series of contacts which are progressively closed as it is operated toward its extreme position, circuit means having connection to said time measuring means and including means adapted to repeatedly supply current thereto and repeatedly initiate an operation thereof; a group of five control circuits, a series of six selectors one for each of six different car retarder leaving speeds, each said selector having a first and a second position and provided with second position contacts, an initial and a partial pressure determining circuit network including a group of connections which are connected in a predetermined manner to said second positio selector contacts and to said control circuits to select any pair of the control circuits as an initial pressure control circuit and as a partial pressure control circuit for each of said leaving speeds, and a partial pressure release speed and full release speed circuit network comprising connections to said time measuring means contacts and to said second position selector contacts and to a current source to predetermine the speeds at which current is supplied to the pair of control circuits selected for each said leaving speed.

10. In a pressure actuated car retarder having full pressure, three different partial pressure and full release pressure conditions and which retarder is located at a stretch of railway track formed with a series of track circuits, the combination comprising, a time measuring means having an initial position and an extreme position toward which it is operated when supplied with current; said time measuring means provided with a series of contacts which are progressively closed as it is operated toward its extreme position, circuit means having connection to said time measuring means and including means adapted to repeatedly supply current thereto and repeatedly initiate an operation thereof; a group of five control circuits, a series of six selectors one for each of six different car retarder leaving speeds, each said selector having a first and a second position and provided with second position contacts, an initial and partial pressure determining circuit network including a group of connections between contacts of said second position selector contacts and terminals of said control circuits, said connections including selective circuit connectors to enable different selections of two paths between said selectors and said control circuits and thereby predetermine any pair of the control circuits as an initial pressure circuit and a partial pressure circuit for each of said leaving speeds, a pair of control relays, a current source, means including contacts of said control relay to connect said source to said selector contacts to energize said pair of control circuits selected by said selective connections, a partial pressure release speed and full release speed circuit network including a group of connections between contacts of said time measuring means, contacts of said selectors and said control relays, and said last mentioned group of connections including selective circuit connectors to enable the partial pressure release speed and the full release speed to be predetermined for each of said leaving speeds.

References Cited in the file of this patent

UNITED STATES PATENTS

| | | |
|---|---|---|
| 1,620,562 | Licht | Mar. 8, 1927 |
| 2,320,802 | Snavely | June 1, 1943 |